UNITED STATES PATENT OFFICE.

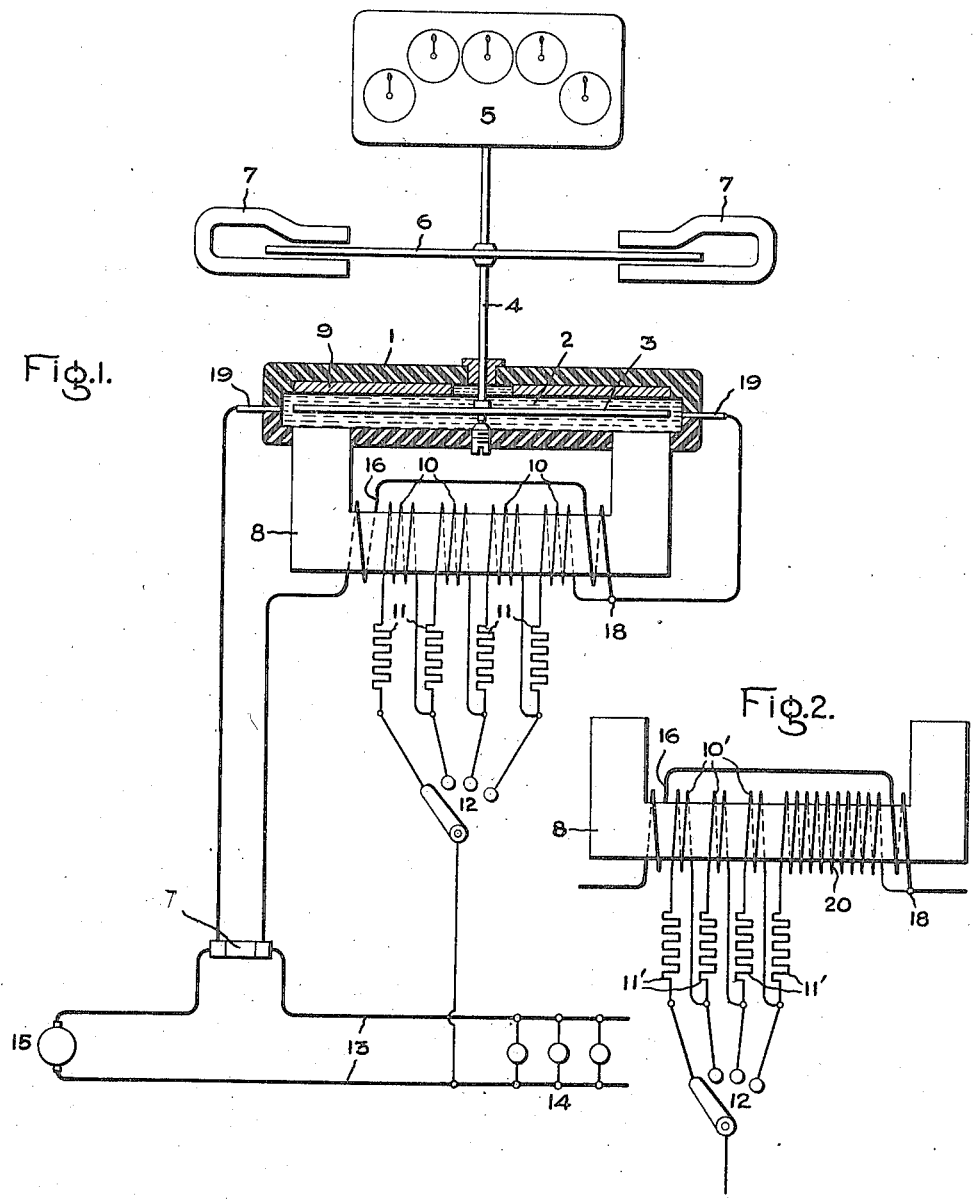

ALBERT G. DAVIS, OF SCHENECTADY, NEW YORK, ASSIGNOR TO GENERAL ELECTRIC COMPANY, A CORPORATION OF NEW YORK.

ELECTRIC METER.

1,157,926.  Specification of Letters Patent.  Patented Oct. 26, 1915.

Application filed January 13, 1913. Serial No. 741,667.

*To all whom it may concern:*

Be it known that I, ALBERT G. DAVIS, a citizen of the United States, residing at Schenectady, county of Schenectady, State of New York, have invented certain new and useful Improvements in Electric Meters, of which the following is a specification.

My invention relates to electric meters, and more particularly to friction compensating devices for such meters.

The object of my invention is to provide a novel and improved construction for readily and accurately adjusting or compensating electric meters for friction at starting and at light loads.

My invention is particularly adapted to be employed in connection with electric meters of the mercury motor type in which a rotatable disk armature is submerged in mercury contained in a suitable chamber, and I have accordingly chosen this type of meter for the purpose of illustrating and describing my invention. In this type of meter the mercury serves to convey the main load current, or a portion thereof obtained by the usual shunt, to the disk armature, which latter is located in a magnetic field proportional to the voltage of the circuit. The reaction between this magnetic field and the current passing through the disk armature produces rotation of the latter, according to well known and established principles.

In meters of the mercury motor type it is customary to connect the potential winding to the meter armature in such a manner that all or a portion of the current flowing in the winding also passes through the meter armature. The current which thus flows through both the meter armature and the potential winding produces a torque upon the armature which acts to compensate the meter for friction at starting and at light loads. This torque may be varied by varying the current flowing through the armature, but since it is desirable that the field set up by the potential winding be maintained substantially constant it is necessary to provide means for maintaining this constant field while varying the compensating current flowing through the armature. By my invention this object is accomplished in a convenient and simple manner and the meter readily and accurately compensated for friction at starting and at light loads.

In carrying out my invention I connect the potential winding to the armature circuit in such a manner that the current flowing through the potential winding also flows through the armature circuit, and I accomplish the object of my invention by the provision of means for varying the current flowing in the potential winding without substantially altering the active ampere turns of such winding. The novel features which I believe to be characteristic of my invention are indicated in the claims appended hereto. The features of construction and mode of operation of a meter embodying my invention will be understood from the following description taken in connection with the accompanying drawings, in which:

Figure 1 is a diagrammatic view of a meter embodying the novel features of my invention and Fig 2 is a modification thereof.

The meter shown in the drawings comprises a casing or receptacle 1 of insulating material adapted to contain a quantity of mercury 2. Within the casing and submerged in the mercury is a rotatable disk armature 3 secured to a pivoted shaft 4. The shaft 4 drives a counter mechanism 5 in the well known manner, and is provided with the usual damping disk 6 operatively located between permanent magnets 7. An electromagnet 8 has its poles entering the base of the casing 1 at a suitable distance from each side of the center thereof. An iron or steel plate 9 is inserted in the top of the casing 1 and forms a return path for the magnetic lines of force proceeding from pole to pole of the magnet 8.

The electromagnet is energized by a potential winding or coil constructed in several sections 10. In series with each section of this winding is a resistance 11. Each section of the winding, together with its associated resistance, is suitably connected to a dial switch 12 in such a manner that a movement of the operating lever of the switch serves to place one or more units of winding and resistance in circuit across the mains 13, which latter supply current to the load 14 from a suitable source 15. The electromagnet is also provided with a few turns of a compound series winding 16 connected in series with the armature and the load. In the drawings a shunt 17 is shown so that only a portion of the load current passes through the armature and the series winding. In order that the current taken by the potential winding may flow through the armature a tap is made in the series winding at 18 to which is connected one terminal of the first section of the potential winding. The current is conducted to and from the armature by means of terminals 19 passing through the casing and in contact with the mercury within the same.

The operation of my improved friction and light load compensating means is as follows: The total current passing through the potential winding must also pass through the meter armature. This current acts to compensate for the friction of the meter at starting and at light loads. The amount of this current can be varied by the manipulation of the operating handle of the switch 12, and thus the degree or amount of compensation can be adjusted. The sections 10 of the potential winding and their respective associated resistances 11 are so proportioned that the total ampere turns of the potential winding is substantially constant, for a constant terminal voltage, for any position of the switch 12. The compensating current flowing through the armature and potential winding in series can thus be varied and adjusted without altering the strength of the field due to the potential winding.

In Fig. 2 of the drawings I have illustrated a modified construction. It will obviously be unnecessary in many cases to divide the entire potential winding into sections as shown in Fig. 1. In such cases the construction shown in Fig. 2 may be employed. In this figure the major portion 20 of the potential winding is without taps and only a few of the end turns of the winding are divided into the sections 10'. Associated with each section 10' is a resistance 11', and the sections and resistances are connected to the switch 12 as in the construction described in connection with Fig. 1. By the construction of Fig. 2 a finer adjustment of the compensating current can be obtained, but the total range of adjustment is less than with the construction of Fig. 1.

In the construction shown in both Figs. 1 and 2, the proper apportionment of the number of turns of the potential winding in each section, and of the amount of resistance associated with each section is an important condition precedent to the successful operation of my invention. As previously intimated, the number of turns of winding in each section and the amount of resistance associated therewith are so determined that the active ampere turns of the potential winding remain substantially constant regardless of the position of the switch 12, and provided of course that the terminal voltage of the external circuit remains constant. The ampere turns of the potential winding are thus substantially independent of the number of sections actively included in the circuit of the potential winding. The armature circuit has an appreciable resistance and for this reason it is necessary to employ the resistance sections 11 or 11', as the case may be, in order to maintain the ampere turns substantially constant regardless of the number of actual turns actively included in the potential winding.

It is evident that other arrangements of resistances and sections of potential winding can be employed other than those which I have specifically illustrated in the drawings. I do not wish, therefore, to be limited to the precise constructions shown and described since many changes may be made therein without departing from the spirit of my invention.

What I claim as new and desire to secure by Letters Patent of the United States, is:—

1. An electric meter comprising a receptacle containing mercury, a rotatable armature within said receptacle, a potential winding electrically connected to said armature, means for supplying to said armature a friction compensating current, and means for adjusting the amount of said compensating current by varying the current flowing in said potential winding and for maintaining the field strength due to said potential winding substantially constant as the current flowing therein is varied.

2. An electric meter comprising a rotatable armature, a potential winding electrically connected to said armature, a resistance electrically connected to the potential winding, and means for simultaneously cutting out a section of the potential winding and a section of the resistance.

3. An electric meter comprising a rotatable armature, a potential winding in series with said armature, said potential winding having several sections, a resistance in series with each section of said winding, and means for varying the number of sections and associated resistances actively included in the potential winding.

4. An electric meter comprising a rotatable armature, a potential winding in series with said armature, said potential winding having a plurality of sections, a resistance in series with each section, the number of turns of winding in each section and the amount of resistance associated therewith being such that the ampere turns of the potential winding are substantially independent of the number of sections actively included in the winding, and means for varying the number of sections actively included in the potential winding.

5. An electric meter comprising a rotatable armature, a potential winding electrically connected thereto, a resistance electrically connected to said winding, said winding and said resistance being divided into operatively associated sections, the number of turns of winding and the amount of resistance included in each section being such that the ampere turns of the potential winding are substantially independent of the number of sections actively included in the winding, and means for varying the number of associated sections actively included in the potential winding.

6. An electric meter comprising a receptacle containing mercury, a rotatable disk armature within said receptacle, means for supplying current to said armature, a potential winding electrically connected to said armature, a resistance electrically connected to said winding, said winding and said resistance being operatively divided into associated sections, the value of the resistance of said sections being such that the ampere turns of the potential winding remain substantially constant regardless of the number of turns actively included in the winding, and means for varying the number of associated sections actively included in the potential winding.

In witness whereof, I have hereunto set my hand this 11th day of January, 1913.

ALBERT G. DAVIS.

Witnesses:
   BENJAMIN B. HULL,
   HELEN ORFORD.